United States Patent [19]

Rogers

[11] Patent Number: 5,335,573
[45] Date of Patent: Aug. 9, 1994

[54] APPARATUS FOR TRIMMING A DEFORMABLE SUBSTRATE

[76] Inventor: George M. Rogers, 3750 S. 91 St., Milwaukee, Wis. 53228

[21] Appl. No.: 18,861

[22] Filed: Mar. 22, 1993

[51] Int. Cl.⁵ .............................................. B26D 7/02
[52] U.S. Cl. ...................................... 83/870; 83/455; 83/464; 83/522.19; 83/614
[58] Field of Search ............... 83/464, 452, 563, 614, 83/412, 455, 522.19, 870, 929, 466.1, 953

[56] References Cited

U.S. PATENT DOCUMENTS

| | | | |
|---|---|---|---|
| 1,050,194 | 1/1913 | Wuggenig | 83/870 X |
| 2,973,577 | 3/1961 | Schekowski | 83/455 X |
| 3,327,588 | 6/1967 | Yandell . | |
| 3,337,955 | 8/1967 | Poletajev | 30/294 |
| 3,352,011 | 11/1967 | Alexander et al. | 30/140 |
| 3,388,469 | 6/1968 | Neiiendam | 83/870 X |
| 3,535,827 | 10/1970 | Oltra | 51/135 |
| 3,693,253 | 9/1972 | Jager et al. | 30/140 |
| 3,779,119 | 12/1973 | Broides | 83/614 X |
| 3,803,713 | 4/1974 | Jones et al. | 30/123 |
| 3,831,279 | 8/1974 | Burns | 30/280 |
| 3,886,657 | 6/1975 | Fabian | 83/614 X |
| 3,978,749 | 9/1976 | Polenz | 83/169 |
| 4,017,012 | 4/1977 | Brock | 225/96.5 |
| 4,184,472 | 1/1980 | Benedicto et al. | 83/870 X |
| 4,334,448 | 6/1982 | Messerschmitt | 83/171 |
| 4,604,802 | 6/1982 | Samuelson | 30/314 |
| 4,987,810 | 1/1991 | Stevens | 83/411.1 |

Primary Examiner—Eugenia Jones
Attorney, Agent, or Firm—Godfrey & Kahn

[57] ABSTRACT

An apparatus for trimming a deformable substrate such as a squeegee blade, and which includes a main frame; a track borne by the main frame; a cutter assembly borne by and movable along the track; a support assembly borne by the main frame for supporting the deformable substrate, the support assembly being movable along a path of travel from a first position to a second portion, and wherein when disposed in the second position, the support assembly supports the deformable substrate in a trimming position relative to the cutter assembly; and a holding assembly borne by the main frame and operable to firmly secure, without substantial deformation, the deformable substrate in the trimming position.

17 Claims, 5 Drawing Sheets

APPARATUS FOR TRIMMING A DEFORMABLE SUBSTRATE

BACKGROUND OF THE INVENTION

1. Field of the Invention

The present invention relates to an apparatus for trimming a deformable substrate. More particularly, the present invention relates to a novel and improved apparatus which is operable to secure and trim, without substantial deformation, a deformable substrate in a highly efficient fashion, and which has particular utility when utilized to trim a squeegee blade.

2. Description of the Prior Art

It is often highly desirable to trim, without substantial deformation and with the highest degree of precision, a deformable substrate such as a squeegee blade. For example, in screen printing, a printing ink is applied to one end of a porous screen, and a squeegee blade manufactured from a polymeric based material is then pulled over the screen thereby evenly spreading and forcing the printing ink through the fine mesh openings of the screen, thus forming a desired image on an object of interest which is placed under the screen. As should be understood, in screen printing, one of the keys for achieving high quality printing is to ensure that a substantially even and complete contact is maintained between the squeegee blade and the porous screen. When the squeegee blade becomes worn, due to the effects of friction, or otherwise, it is often trimmed so that it may be employed again. Of course, it is crucial to trim the squeegee blade without substantially deforming the blade and with the greatest possible degree of precision so that the trimmed squeegee blade, when in use, can maintain a substantially even, and complete contact with the porous screen.

Various attempts have been made in the prior art to provide an apparatus which is operable to secure and trim, without substantial deformation, a deformable substrate. While some of the prior art apparatuses have operated with varying degree of success, they have been unsatisfactory in several respects. For example, one deficiency attendant with the prior art apparatuses is their apparent inability to firmly secure, without substantial deformation, a squeegee blade in a trimming position. Another readily identified deficiency attendant with the prior art apparatuses is their inability to inhibit the longitudinal deformation of the squeegee blade which is caused by the effects of friction, imparted by an associated cutter assembly to the squeegee blade, when it acts upon the squeegee blade. As should be understood, and in both instances, the trimmed squeegee blade is usually unacceptable in that it is either uneven, or otherwise ill defined.

Yet another deficiency attendant with the prior art apparatuses results from characteristics inherent in their individual designs inasmuch as they generally cannot properly guide an associated cutter assembly along the squeegee blade in a fashion such that the squeegee blade is trimmed with a high degree of precision. Still another deficiency with the prior art apparatuses is their apparent inability to selectively support the squeegee blade in an appropriate trimming position, and thereafter provide a means for measuring the thickness of material to be trimmed from the squeegee blade.

Therefore, it has long been known that it would be desirable to have a novel and improved apparatus which is operable to secure and trim, without substantial deformation and with a high degree of precision, a deformable substrate in a highly efficient fashion; which has particular utility in trimming a squeegee blade; which is of relatively moderate cost to manufacture, purchase and maintain, and is inexpensive to operate; and which further is characterized by simplicity of construction and ease of utilization.

SUMMARY OF THE INVENTION

Therefore, it is an object of the present invention to provide a novel and improved apparatus for trimming a deformable substrate.

Another object of the present invention is to provide such an apparatus which is operable to trim, without substantial deformation and with a high degree of precision, a deformable substrate such as a squeegee blade.

Another object of the present invention is to provide such an apparatus which includes a support assembly which is movable along a path of travel to support the squeegee blade in an appropriate trimming position.

Another object of the present invention is to provide such an apparatus which includes a device which is operable to move the support assembly along the path of travel.

Another object of the present invention is to provide such an apparatus which includes a holding assembly which is operable to firmly secure, without substantial deformation, the squeegee blade in the trimming position.

Another object of the present invention is to provide such an apparatus which includes a means which is operable to measure the thickness of material to be trimmed from the squeegee blade which is supported in the trimming position.

Another object of the present invention is to provide such an apparatus which includes a movable cutter assembly which is operable to trim, with a high degree of precision, a predetermined thickness of material from the squeegee blade which is secured in the trimming position.

Another object of the present invention is to provide such an apparatus which includes an arresting assembly which is operable to substantially impede longitudinal deformation of the squeegee blade as the squeegee blade is trimmed.

Another object of the present invention is to provide such an apparatus which is operable to trim the squeegee blade in a highly efficient fashion.

Another object of the present invention is to provide such an apparatus which is of relatively moderate cost to manufacture, purchase, and maintain, and which further is inexpensive to operate.

Another object of the present invention is to provide such an apparatus which is characterized by ease of utilization and simplicity of construction.

Still another object of the present invention is to provide such an apparatus which is operable to obtain the individual benefits and advantages to be derived from related prior art apparatuses while avoiding the assorted detriments individually associated therewith.

Further another object of the present invention is to provide novel and improved elements and arrangements thereof in an apparatus for the purposes described, and which is dependable, economical, durable and fully effective in accomplishing its intended purposes.

These and other objects and advantages are achieved in a novel and improved apparatus for trimming a deformable substrate such as a squeegee blade, the apparatus including a main frame; a track borne by the main frame; a cutter assembly borne by and movable along the track; a support assembly borne by the main frame for supporting the deformable substrate, the support assembly being movable along a path of travel from a first position to a second position, and wherein the support assembly when disposed in the second position is operable to support the deformable substrate in a trimming position relative to the cutter assembly; and a holding assembly borne by the main frame and operable to secure the deformable substrate in the trimming position.

These and other objects and advantages of the present invention will become more apparent from the following detailed description of the preferred embodiment of the present invention taken in combination with the accompanying drawings and the attached claims.

DESCRIPTION OF THE PREFERRED EMBODIMENT

Figure 1:
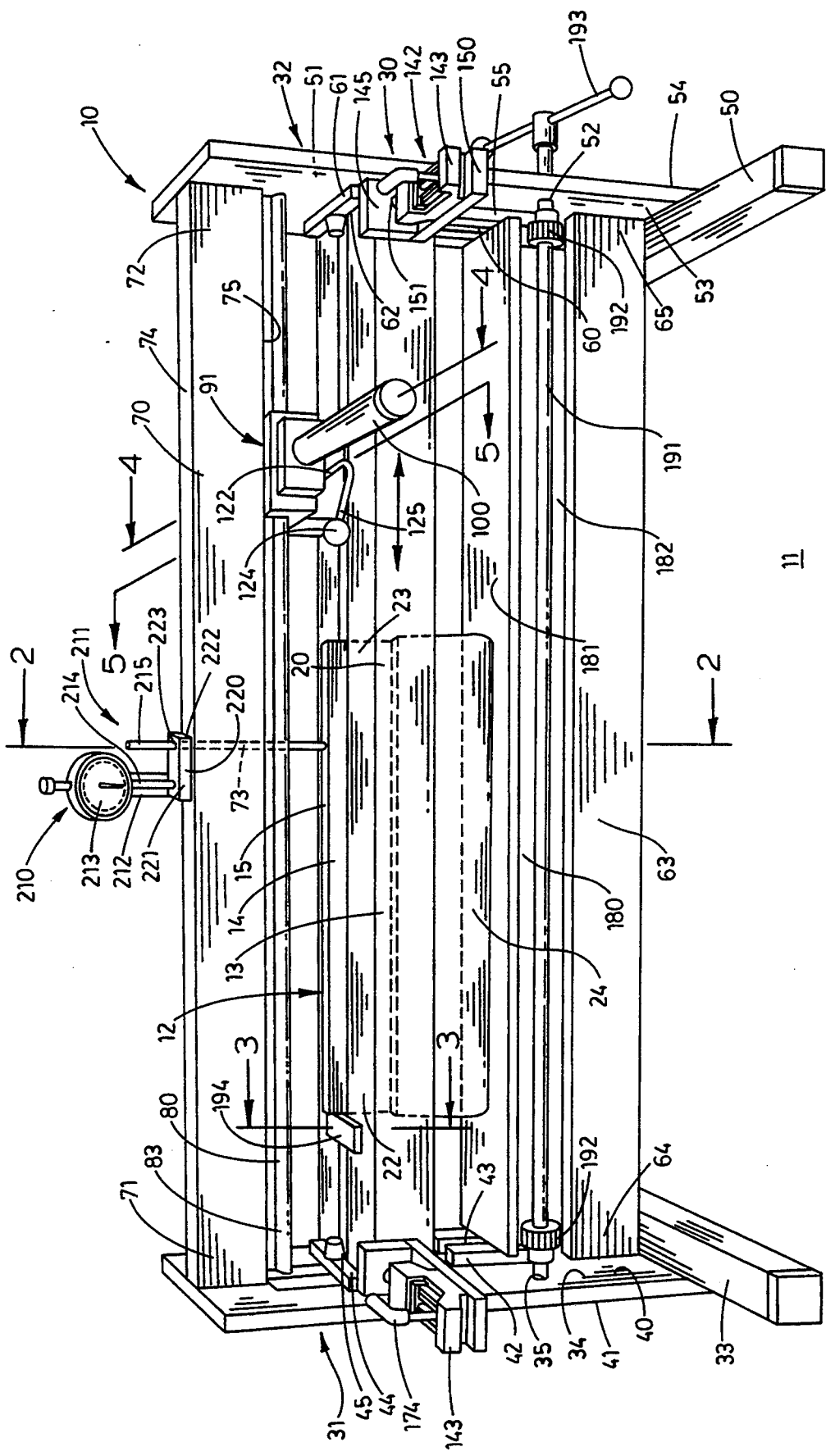
FIG. 1 is a perspective, environmental view of the apparatus embodying the principles of the present invention, and which is shown in a typical operative configuration.

Referring more particularly to the drawings, the apparatus for trimming a deformable substrate of the present invention is generally indicated by the numeral 10 in FIG. 1. For purposes of illustrative convenience, the apparatus 10 is shown and described hereinafter as it would be configured if it were utilized to trim a squeegee blade. However, it should be understood that the apparatus 10 of the present invention may be employed in a variety of different operational environments, none of which will effect the operation of same. The apparatus 10 will be discussed in greater detail hereinafter.

As best illustrated by reference to FIG. 1, the apparatus 10 of the present invention rests on a substantially horizontal supporting surface 11, such as a factory floor, and the like, and is operable to secure and trim, without substantial deformation, a deformable substrate. As discussed earlier, the apparatus 10 has particular utility when employed to trim a squeegee blade 12 which is manufactured from a polymeric based material. As best illustrated by reference to FIGS. 1 and 2, the squeegee blade 12 has a substantially rectangular shaped main body 13 which has an upper longitudinal portion 14 which defines an upper longitudinally disposed peripheral edge 15; an opposite lower longitudinal portion 20, which defines a lower longitudinally disposed peripheral edge 21 (shown in FIG. 2); a first end 22; and an opposite second end 23. Furthermore, the lower longitudinal portion 20 of the Squeegee blade 12 is secured in a substantially rectangular shaped handle 24 which may be manufactured out of assorted different materials such as wood, metal, plastic, or the like. As should be understood, the upper longitudinally disposed peripheral edge 15 of the squeegee blade 12 is used in screen printing, and therefore needs to be trimmed when it becomes worn.

Figure 2:
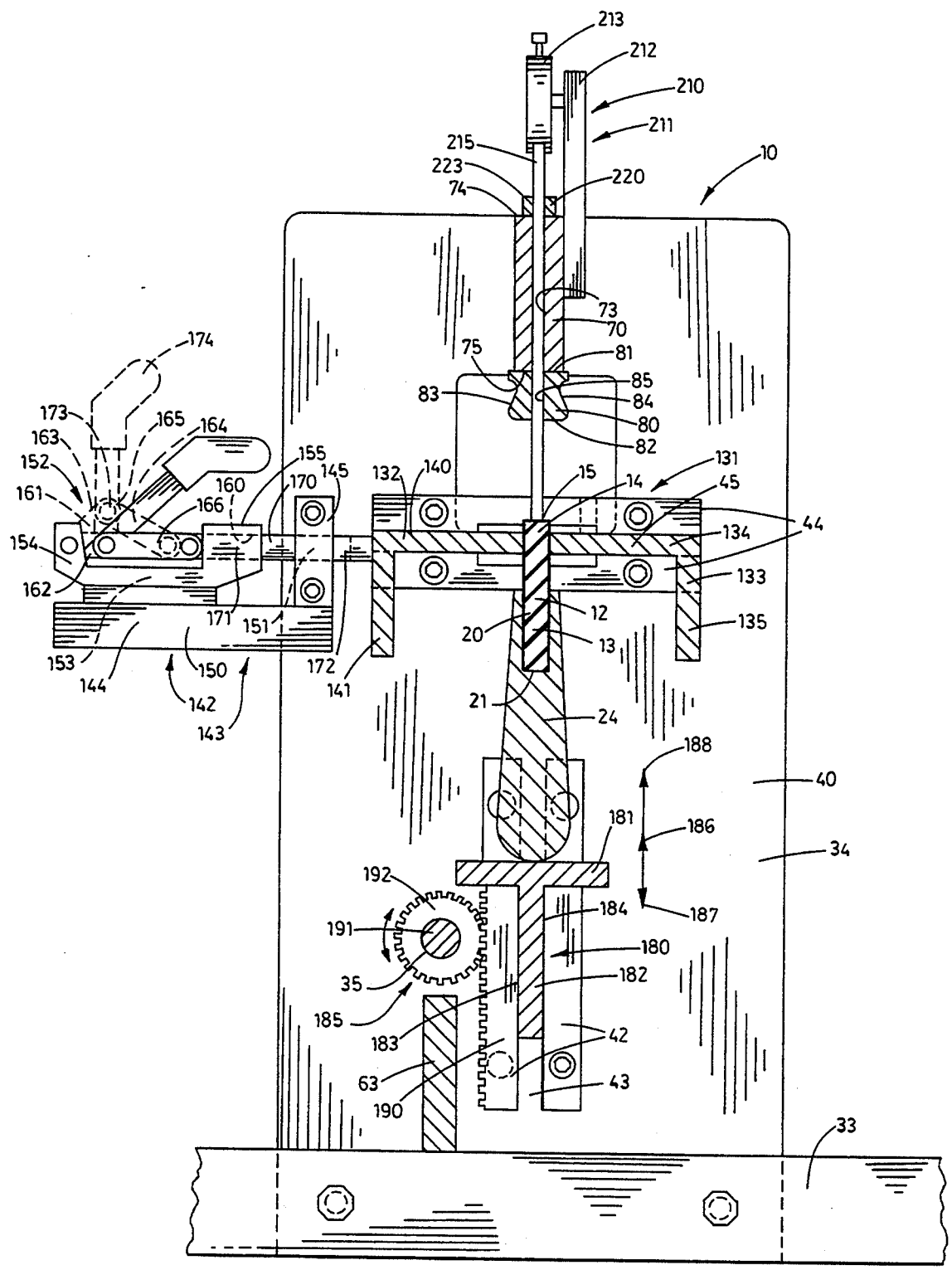
FIG. 2 is a fragmentary, transverse, vertical, sectional view taken from a position along line 2—2 of FIG. 1.

As best illustrated by reference to FIG. 1, the apparatus 10 of the present invention includes a main frame which is generally indicated by the numeral 30. As shown in the drawings, the main frame 30 includes a first portion 31, and an opposite second portion 32. The first and second portions 31 and 32 are positioned in predetermined, spaced, substantially parallel relation one to the other. Furthermore, the first portion 31 includes a substantially horizontally disposed base member 33 which rests on the supporting surface 11, and a substantially vertically disposed end panel or plate 34 which is made integral with the base member 33 by employing suitable fasteners or other techniques such as welding or the like. The end plate 34 has an aperture 35; an interior facing surface 40; and an opposite exterior facing surface 41. A pair of spaced, substantially vertically disposed bars or guide members 42 are mounted on the interior facing surface 40 of the end plate 34, and which define a substantially vertically oriented channel 43, therebetween. Moreover, a pair of spaced, substantially horizontally disposed bars or guide member 44 are mounted on the interior facing surface 40 of the end plate 34. The bars or guide members 44 define a substantially horizontally oriented channel 45 therebetween. As shown in FIG. 2, the channel 45 is positioned above the channel 43. Similar to the first portion 31, the second portion 32 includes a substantially horizontally disposed base member 50 which rests on the supporting surface 11, and a substantially vertically disposed end panel or plate 51 which is made integral with the base member 50 by employing suitable fasteners or other techniques such as welding or the like. The end plate 51 has an aperture 52 formed therein; and further includes an interior facing surface 53; and an opposite exterior facing surface 54. As best illustrated by reference to FIG. 1, a pair of spaced, substantially vertically disposed bars or guide members 55 are mounted on the interior facing surface 53 of the end plate 51, thereby defining a substantially vertically oriented channel 60, therebetween. Furthermore, a pair of spaced, substantially horizontally disposed bars or guide member 61 are mounted on the interior facing surface 53 of the end plate 51, and which define a substantially horizontally oriented channel 62, therebetween. The horizontally oriented channel 62 is disposed above the channel 60. As should be understood, the respective apertures 35 and 52; the vertically oriented channels 43 and 60; and the horizontally oriented channels 45 and 62 are positioned or otherwise oriented in substantial alignment one to the other. The function of each of these objects or elements will be discussed in greater detail hereinafter. The main frame 30 further includes a substantially horizontally disposed support beam which is generally indicated by the numeral 63. The support beam 63 has a substantially rectangular cross-sectional shape; a first end 64 which is secured as by welding or the like to the respective interior facing surface 40 of the end plate 34; and an opposite second end 65 which is secured to the respective interior facing surface 53 of the end plate 51.

Figure 4:
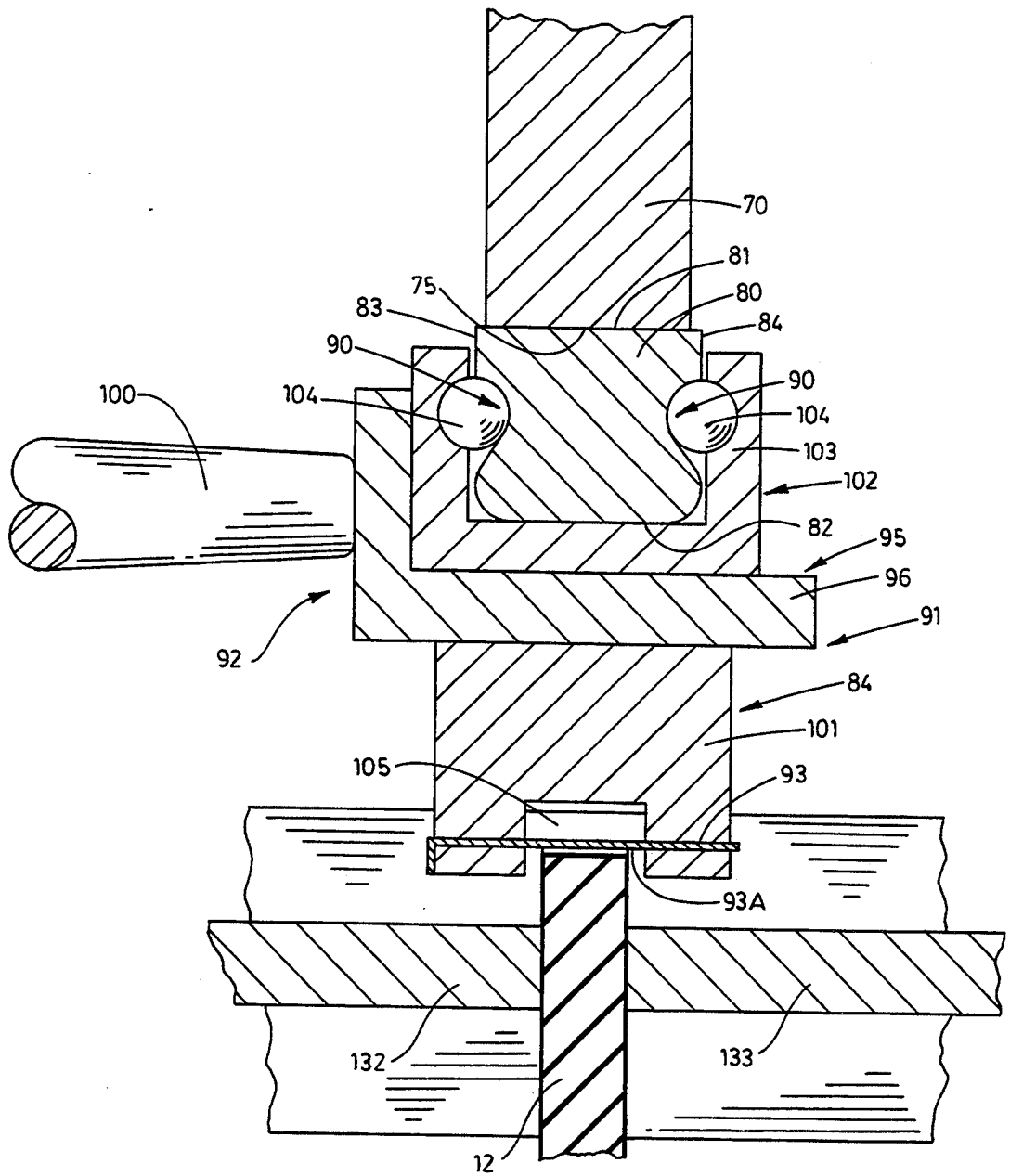
FIG. 4 is a fragmentary, transverse, vertical, sectional view taken from a position along line 4—4 of FIG. 1.

As best seen by reference to FIGS. 1 and 2, the apparatus 10 further includes a substantially horizontally disposed gantry 70, which is borne by the main frame 30, and which is disposed in predetermined, spaced relation above the horizontally oriented channels 45 and 62, respectively. The gantry 70 has a substantially rectangular cross-sectional shape; a first end 71, which is secured as by welding or the like on the interior facing surface 40 of the end plate 34; an opposite second end 72, which is secured on the interior facing surface 53 of the end plate 51; a substantially vertically disposed aperture 73; an upper peripheral edge 74; and an opposite lower peripheral edge 75. As best seen by reference to FIGS. 4 and 5, the apparatus 10 further includes a track 80 which is borne on the lower peripheral edge 75 of the gantry 70. The track 80 has a generally rectangular cross-sectional shape; a top surface 81; an opposite bottom surface 82; a first side wall 83; an opposite second side wall 84; and a substantially vertically disposed aperture 85. The top surface 81 of the track 80 is secured as by welding or other suitable fasteners or the like on the lower peripheral edge 75 of the gantry 70. Further, the respective apertures 73 and 85 are substantially coaxially aligned one with the other. Moreover, each of the side walls 83 and 84 has formed therein a longitudinally extending, substantially horizontally disposed U-shaped channel 90. The function of the respective apertures 73 and 85, and the respective U-shaped channels 90, will be discussed in greater detail hereinafter.

The apparatus 10 further includes a cutter assembly which is borne by and movable along the track 80, and which is generally indicated by the numeral 91. The cutter assembly 91 is operable to trim a deformable substrate such as the squeegee blade 12. As best illustrated by reference to FIGS. 1, 4 and 5, the cutter assembly 91 includes a carriage 92 which is borne by and movable along the track 80; a severing member such as a blade 93, which is borne by the carriage 92 and which is operable to trim the squeegee blade 12; and a securing assembly 94 which is borne by the carriage 92, and which is operable to releasably secure the blade 93 in an operational position on the carriage 92. The blade 93 and the securing assembly 94 will be discussed in greater detail hereinafter. The carriage 92 has a main body 95 which includes a substantially L-shaped central portion 96; a handle 100 which is affixed on the L-shaped central portion 96, and which extends outwardly therefrom; a lower portion 101 which is secured, as by welding or the like, on the L-shaped central portion 96; and a ball bearing assembly 102 which is secured as by welding or other suitable fastening techniques to the L-shaped central portion 96. The ball bearing assembly 102 is of conventional design and includes a substantially U-shaped frame 103 and two opposed groups of ball bearings 104 which are individually rotatably borne by the U-shaped frame 103. As best illustrated by reference to FIG. 5, the U-Shaped frame 103 is dimensioned or shaped such that the two groups of ball bearings 103 individually slidably engage the respective U-shaped channels 90 of the track 80, thereby rendering the ball bearing assembly 102 reciprocally movable along the track 80.

Figure 5:
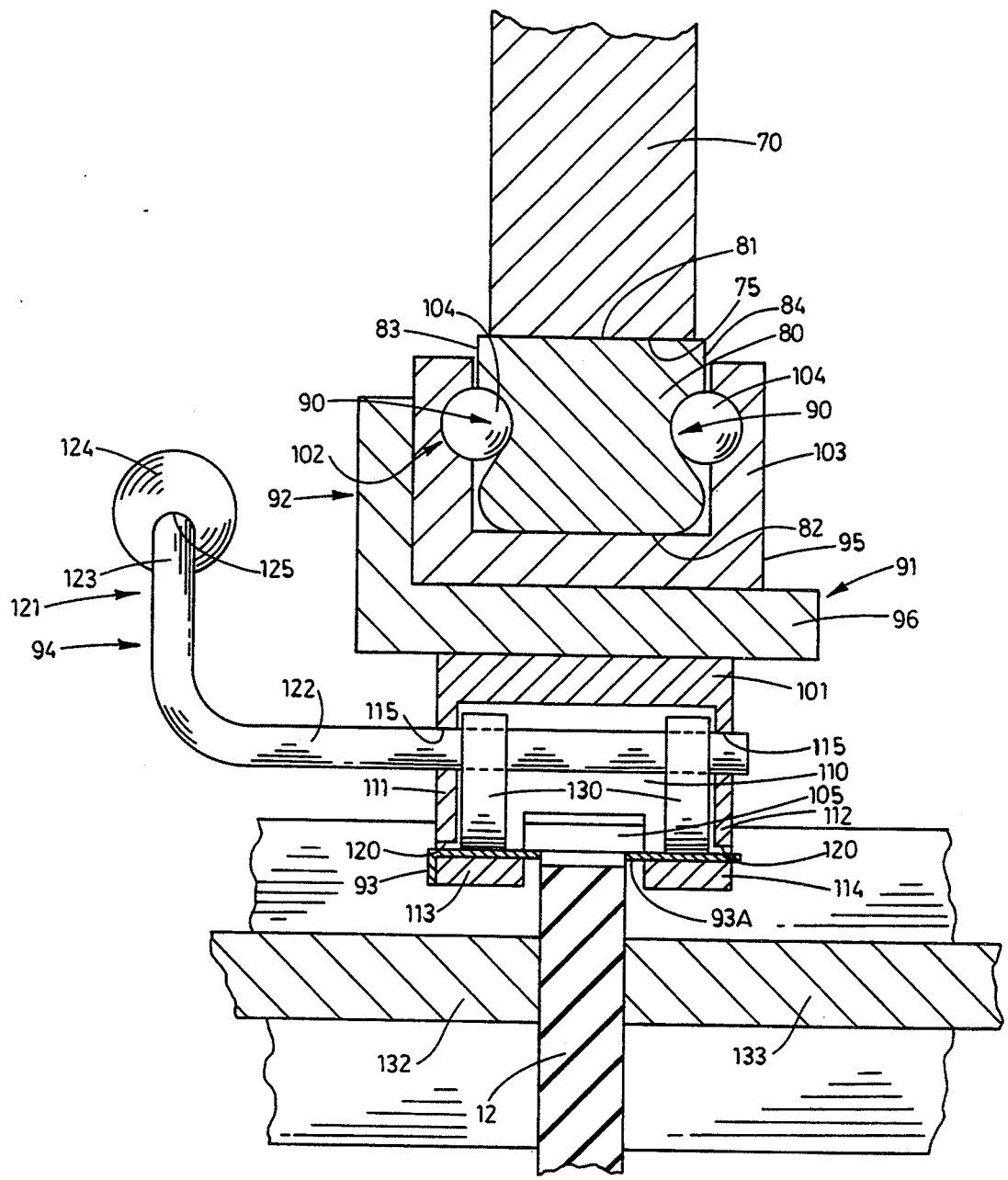
FIG. 5 is a greatly enlarged, fragmentary, transverse, vertical, sectional view taken from a position along line 5—5 of FIG. 1.

As best illustrated by reference to FIG. 5, the lower portion 101 of the carriage 92 has formed therein a substantially longitudinally disposed passageway 105. Furthermore, the lower portion 101 has formed therein an internal operating cavity 110 which is defined, in part, by two spaced, substantially vertically disposed side walls 111 and 112, respectively; and two spaced, substantially horizontally disposed plates 113 and 114, respectively. The plates are each attached on the respective side walls 111 or 112 and each plate extends normally inwardly therefrom. Each of the side walls 111 and 112 has formed therein an aperture 115, and a substantially horizontally disposed and elongated slot 120 which is positioned below the aperture 115 and adjacent to the respective plates 113 and 114, respectively. The respective apertures 115, and the respective slots 120 are individually oriented in substantially coaxial alignment one with the other. The blade 93 which is of conventional design is inserted through the coaxial aligned slots 120 and into the cavity 110. The blade 93 is supported by the two plates 113 and 114, respectively. As shown in FIG. 5, and when inserted in the cavity 110, a portion of the blade 93A is located in the passageway 105 and thereby oriented in an operational position. As will be discussed hereinafter, the blade 93 is operable to trim the squeegee blade 12. As best illustrated by reference to FIG. 5, the securing assembly 94 has a handle 121. The handle 121 has a substantially horizontally disposed first shaft 122 which is rotatably received in the respective apertures 115; a second shaft 123 which is attached to or made integral with the first shaft 122, and which extends substantially normally outwardly therefrom; and a knob 124 which is mounted on the distal end 125 of the second shaft 123. Furthermore, the securing assembly 94 has a pair of cams 130 which are disposed in the cavity 110, and which are individually affixed on the first shaft 122. The cams 130 are sized or shaped such that when the handle 121 is rotated in a clockwise direction (when viewed in FIG. 1) to a locked position, the cams individually frictionally engage the blade 93 by firmly pressing the blade against the respective plates 113 and 114 thereby securing the blade 93 in the operational position on the carriage 92. Of course, when the handle 121 is rotated in a counterclockwise direction to an unlocked position, the cams 130 individually disengage the blade 93 so that it can be easily adjusted or replaced.

Figure 3:
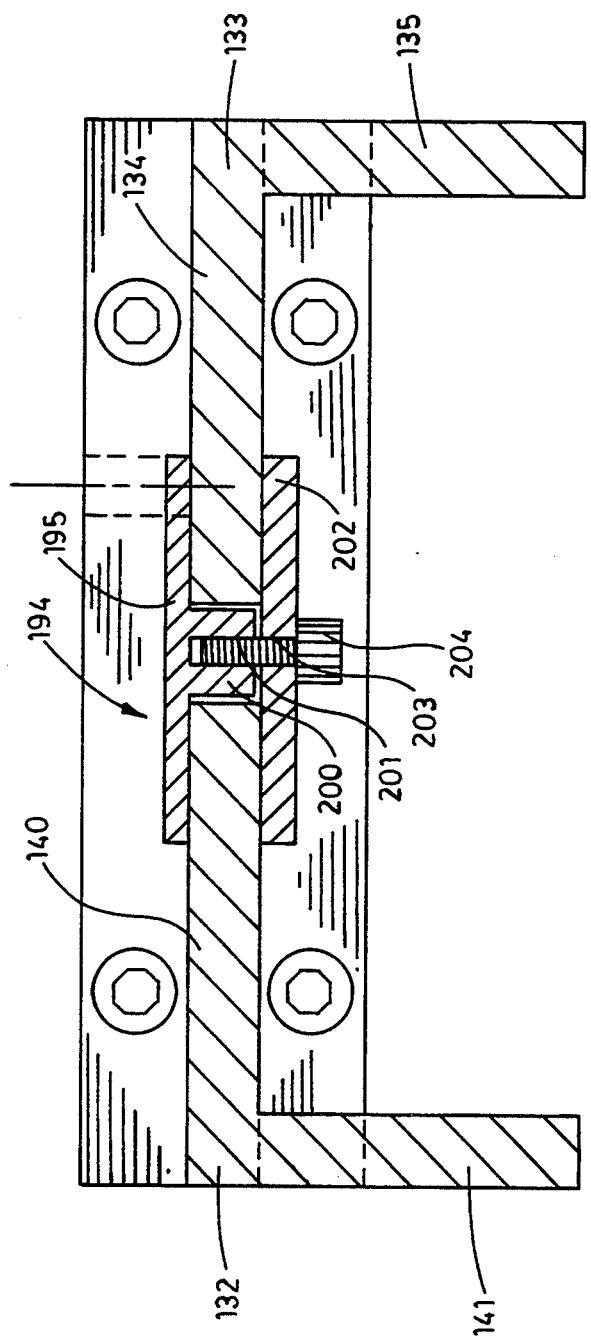
FIG. 3 is a fragmentary, transverse, vertical, sectional view taken from a position along line 3—3 of FIG. 1.

As best illustrated by reference to FIGS. 1, 2 and 3, the apparatus 10 further includes a holding or positioning assembly 131 which is borne by the main frame 30 and which is operable to secure the squeegee blade 12 in a trimming position relative to the cutter assembly 91. The holding or positioning assembly 131 includes a pair of parallel clamping bars or members 132 and 133, respectively. The second clamping bar or member 133 is fixedly received in the respective horizontally disposed channels 45 and 62. The second clamping bar 133 has a substantially horizontally disposed beam portion 134, and a substantially vertically disposed flange portion 135. The first clamping bar or member 132 is slidably received in the respective horizontally disposed channels 45 and 62. The first clamping bar 132 has a substantially horizontally disposed beam portion 140, and a substantially vertically disposed flange portion 141. As should be understood, the first clamping bar 132 is reciprocally movable relative to the fixed, second clamping bar 133 by means of a clamping assembly 142. The respective clamping bars 132 and 133 are operable to firmly secure, without substantial deformation, the squeegee blade 12 therebetween.

The clamping assembly 142 is borne by the apparatus 10 and includes a pair of clamping mechanisms 143 which are of substantially identical construction. For the sake of brevity, therefore, only one clamping mechanism 143 will be discussed in significant detail hereinafter. As best illustrated by reference to FIGS. 1 and 2, each of the clamping mechanisms 143 includes a support frame 144. The support frame 144 has a substantially vertically disposed first member 145 which is secured on the interior facing surface 40 of the end plate 34, and which has formed therein a substantially centrally disposed aperture 151. Further, the individual support frames 144 include a substantially horizontally disposed second member 150 which is mounted on the first member 145 and which extends outwardly relative thereto. Mounted on the second member 150 is a toggle device 152 which includes a main body 153 which has a first member 154; and a second member 155 which has an aperture 160 formed therein. Furthermore, the toggle device 152 includes a first link or thrust rod 161 which has a first end 162 which is pivotally mounted on the first member 154, and an opposite, second end 163. The toggle device 152 further includes a second link or thrust rod 164 which has a first end 165 which is pivotally mounted, as a pin 173 or the like, to the second end 163 of the first thrust rod 161, and an opposite second end 166. The toggle device 152 further includes a third link or thrust rod 170 and which is slidably received in the respective apertures 151 and 160. The third thrust rod 170 has a first end 171 which is pivotally joined on the second end 166 of the second thrust rod 164, and an opposite second end 172. Affixed to the second end 162 of the first thrust rod 161 is a handle 174. As should be understood, pushing the handle 174 in a clockwise direction when viewed from FIG. 2 will advance the third thrust rod 170 thereby causing the first clamping bar 132 to move toward the fixed second clamping bar 133 and along the respective horizontally disposed channels 45 and 62. When the first clamping bar 132 advances towards the second clamping bar, the squeegee blade 12 is secured between the first and second clamping bars 132 and 133 and in the trimming position. In contrast, pulling the handle 174 in a counterclockwise direction will cause the withdrawal of the third thrust rod 170 thereby causing the first clamping bar 133 to move away from the fixed, second clamping bar 132. The toggle device 152 provides a convenient means to easily adjust the pressure applied to the clamping bars 132 and 133. As should be understood, and depending upon the hardness of the particular polymeric material employed in the manufacture of the squeegee blade, the pressure applied should be such that the clamping bars 132 and 133 can firmly secure the squeegee blade 12 in the trimming position but not simultaneously cause substantial deformation. As should be understood, deformation of the squeegee blade 12 will cause the apparatus of the present invention to create an unacceptable, substantially curved peripheral edge, as opposed to a substantially flat peripheral edge.

The apparatus 10 further includes a support assembly 180 which is borne by the main frame 30 and which is operable to support the squeegee blade 12. As best seen by reference to FIGS. 1 and 2, the support assembly 180 has a substantially horizontally disposed first member 181, and a substantially vertically disposed second member 182. The second member is mounted on the first member 181 and has a first surface or sidewall 183, and an opposite second surface or sidewall 184. As best seen in FIG. 2, the second member 182 is slidably received in the respective vertically disposed channels 43 and 60, and is movable along a substantially vertically disposed path of travel 186 defined by the respective channels 43 and 60 from a first, lower position 187 to a second, upper position 188 by a propulsion or driving assembly 185 which will be discussed in greater detail hereinafter. As should be understood by reference to FIG. 2, when disposed in the second position 188, the support assembly 180 supports the squeegee blade 12 in the trimming position.

As best illustrated by reference to FIGS. 1 and 2, the propulsion or driving assembly 185 includes a pair of spaced, substantially vertically disposed racks 190 which are of conventional design and which are individually mounted on the first surface 183 of the second member 182 of the support assembly 180. The propulsion assembly 185 further includes a shaft 191 which is rotatably supported by the respective apertures 35 and 52 of the main frame 30. A pair of spaced, substantially vertically disposed pinions 192, which are of conventional design, are individually mounted on the shaft 191, and are individually disposed in force engaging relation relative to the respective racks 190. As should be understood, rotation of a handle 193 which is attached to the distal end of the shaft 191 by the application of physical force moves the support assembly 180 upwardly or downwardly along the path of travel 186.

As best illustrated by reference to FIGS. 1 and 3, the apparatus 10 further includes an arresting assembly which is generally indicated by the numeral 194. The arresting assembly 194 includes a substantially rectangular shaped upper plate 195 which has a substantially centrally disposed post 200. The post 200 has a threaded hole or passageway 201. The arresting assembly 194 further includes a substantially rectangular shaped lower plate 202 which has formed therein a substantially centrally disposed aperture 203. The individual beam portions 134 and 140 of the clamping bars are releasably secured between the upper and lower plates 195 and 202 by a hand adjustable screw 204 which is rotatably received in the threaded hole 201 and through aperture 203 in the fashion which is illustrated most clearly by reference to FIG. 3. As should be understood, and when secured between the respective clamping bars 132 and 133 and disposed in juxtaposed relation relative to the first end 22 of the squeegee blade 12, the arresting assembly 194 is operable to substantially impede longitudinal deformation of the squeegee blade 12 which is caused by the effects of friction imparted by the cutter assembly 91 to the squeegee blade 12 as it is trimmed.

The apparatus 10 further includes a means borne by the main frame 30 for measuring the thickness of material to be trimmed from the squeegee blade 12. This measuring means is generally indicated by the numeral 210. In the preferred embodiment, the measuring means 210 is a conventional micrometer assembly 211. As best illustrated by reference to FIGS. 1 and 2, the micrometer assembly 211 includes a substantially vertically disposed support member 212 which is attached by suitable fasteners on the gantry 70, and a micrometer 213 which is attached on the support member 212 and which has a substantially vertically disposed and moveable probe 214. The micrometer assembly 211 further includes a free probe 215 which is slidably received in the coaxially aligned apertures 73 and 85, and through an aperture 223 formed in an elongated reference member 220. The reference member 220 has a first end 221, and an opposite second end 222. The reference member 220 is operable to be selectively secured to the movable probe 215 by a screw (not shown). As should be understood, the first end 221 of the reference member 220 is placed underneath the moveable probe 214 to form a bridge or common reference base for the respective probes 214 and 215 so that the micrometer 213 is operable to precisely measure any upward displacement of the free probe 215.

OPERATION

The operation of the preferred embodiment of the present invention is believed to be readily apparent and is briefly summarized at this point.

The apparatus 10 of the present invention is operable to secure and trim, without substantial deformation, a deformable substrate such as a squeegee blade 12. As best seen by reference to FIG. 1 and 2 and as discussed in greater detail above, the apparatus 10 includes a main frame 30 which has a first portion 31 having a base member 33 and an end plate 34 made integral with the base member 33; an opposite second portion 32 having a base member 50 and an end plate 51 made integral with the base member 50; and a support beam 63 which is attached on the opposite first and second portions 31 and 32, respectively. The end plate 34 has formed therein a vertically disposed channel 43 and a horizontally oriented channel 45. Similarly, the end plate 51 has formed therein a vertically disposed channel 60 and a horizontally oriented channel 62. As best illustrated by reference to FIGS. 1 and 2, the apparatus 10 further has a substantially horizontally disposed gantry 70 which is borne by the respective end plates 34 and 51; and a track 80 which is borne by the gantry 70. The track 80 has opposite, substantially vertically disposed side walls 83 and 84 each of which has formed therein a substantially horizontally disposed and U-shaped channel 90. The apparatus 10 further includes a cutter assembly 91 which has a carriage 92 which is borne by and movable along the channels 90 of the track 80. A blade 93 is borne by the carriage 92 and is operable to trim the squeegee blade 12. A securing assembly 94 is borne by the carriage 92 and is operable to releasably secure the blade 93 in an operational position on the carriage 92. The apparatus 10 further includes a holding or positioning assembly 131 which has a second clamping bar 133 which is fixed in the respective horizontally disposed channels 45 and 62; and a first clamping bar 132 which is slidably received in the respective horizontally disposed channels 45 and 62, and which is movable by means of a pair of clamping mechanisms 143 in the direction of the clamping bar 133 thereby securing the squeegee blade 12 therebetween. The apparatus 10 also includes a support assembly 180 which has a substantially horizontally disposed first member 181, and a substantially vertically disposed second member 182 which is slidably received in the respective vertically oriented channels 43 and 60. The support assembly 180 is movable along a path of travel 186 defined by the vertically disposed channels 43 and 60 by a propulsion assembly 185. An arresting assembly 194 is provided to substantially impede longitudinal deformation of the squeegee blade 12 as it is trimmed. Finally, the apparatus 10 has a measuring means 210 which is operable to determine the thickness of material to be trimmed from the squeegee blade 12.

In operation, an operator (not shown) first moves the cutter assembly 91 along the track 80 to a position which is adjacent to the end plate 51. The blade 93 is inserted into the elongated slots 120 of the carriage 92, and is secured by the securing assembly 94 in an operational position on the carriage 92. The squeegee blade 12 is then placed on the second member 182 of the support assembly 180 in the manner as shown in FIG. 1.

Following this step, the operator rotates the handle 93 of the moving device 185 to move the support assembly 180 from a first, lower position 187 to a second, upper position 188. As should be understood, and when located in the second position, the upper portion 14 of the squeegee blade 12 is disposed between the clamping bars 132 and 133, with its upper peripheral edge 13 being substantially flush with the blade 93 of the cutter assembly 91 and just short of the second position 188. Once this is accomplished, the free probe 215 is pushed downwardly until it touches the upper peripheral edge 13 of the squeegee blade 12. When this occurs, the reference member 220 is placed underneath the probe 214. Based upon the reading of the micrometer 213, the operator exerts force on the handle 193 of the propulsion assembly 185 to move the support assembly 180 (as well as the squeegee blade 12 supported thereon) upwardly a predetermined distance to the second position 188. As should be appreciated, the distance the squeegee 12 is moved is substantially equal to the thickness of material to be trimmed from the squeegee blade 12. The support assembly 180 now supports the squeegee blade 12 in a trimming position relative to the blade 93 of the cutter assembly 91. The free probe 215 is then pulled upwardly away from the squeegee blade 12. Thereafter, the operator exerts force on the handles 174 of the toggle devices 152 thereby causing the respective clamping mechanisms 143 to apply an appropriate amount of pressure to secure, without substantial deformation, the upper portion 14 of the squeegee blade 12 in the trimming position. When this is achieved, the operator secures the arresting assembly 194 between the clamping bars 132 and 133 and positions same in juxtaposed, rested relation against the first end 22 of the squeegee blade 12. The operator then pushes the cutter assembly 91 along the track 80 toward the end plate 34 to trim, without substantial deformation and with a high degree of precision, the upper portion 14 of the squeegee blade 12.

Therefore, the apparatus 10 of the present invention can be utilized in a wide variety of operational environments, is of relatively moderate cost to manufacture, purchase and maintain, is inexpensive to operate, and further is highly efficient in operation and reduces to an absolute minimum the problems associated with prior apparatuses which have been utilized to trim a deformable substrate such as a squeegee blade.

Although the present invention has been herein shown and described in what is conceived to be the most practical and preferred embodiment, it is recognized that departures may be made therefrom within the scope of the present invention which is not to be limited to the illustrative details disclosed.

Having described my invention, what I claim as new and desire to secure by Letters Patent is:

1. An apparatus for trimming a deformable substrate, comprising:
   a main frame;
   a track borne by the main frame;
   a cutter assembly borne by and movable along the track;
   a support assembly borne by the main frame for supporting the deformable substrate, the support assembly being movable along a path of travel from a first position to a second position, and wherein the support assembly when disposed in the second position is operable to support the deformable substrate in a trimming position relative to the cutter assembly;

a holding assembly borne by the main frame and disposed in spaced relation relative to the cutter assembly, the holding assembly operable to contact opposing sides of the deformable substrate to secure the deformable substrate in the trimming position; and an arresting assembly borne by the holding assembly and disposed in juxtaposed relation against an end of the deformable substrate to impede longitudinal deformation of the substrate as it is trimmed by the cutter assembly.

2. An apparatus as claimed in claim 1, and wherein the cutter assembly includes a carriage which is borne by and movable along the track, a severing member which is borne by the carriage and operable to trim the deformable substrate, and a securing assembly which is borne by the carriage and operable to releasably secure the severing member in an operational position on the carriage.

3. An apparatus as claimed in claim 2, and wherein the apparatus further includes a gantry which is borne by the main frame, and wherein the track is borne by the gantry.

4. An apparatus as claimed in claim 3, and wherein the holding assembly includes first and second members, and wherein the second member is fixed, and the first member is operable to move from a location in spaced relationship relative to the second member in the direction of the second member thereby securing the deformable substrate therebetween and in the trimming position.

5. An apparatus as claimed in claim 4, and wherein the first and second members include a pair of clamping bars.

6. An apparatus as claimed in claim 5, and wherein the apparatus further includes means for measuring the thickness of material to be trimmed from the deformable substrate.

7. An apparatus as claimed in claim 6, and wherein the deformable substrate is a polymeric based substrate.

8. An apparatus as claimed in claim 7, and wherein the severing member is a blade.

9. An apparatus for trimming a squeegee blade, comprising:

a main frame;

a gantry borne by the main frame;

a track borne by the gantry;

a cutter assembly borne by the main frame and including a carriage which is borne by and movable along the track, a severing member which is borne by the carriage and operable to trim the squeegee blade, and a securing assembly which is borne by the carriage and operable to releasably secure the severing member in an operational position on the carriage;

a support assembly borne by the main frame for supporting the squeegee blade, the support assembly being movable along a path of travel from a first position to a second position, and wherein the support assembly when disposed in the second position is operable to support the squeegee blade in a trimming position relative to the severing member;

a holding assembly borne by the main frame and including first and second members operable to contact opposing sides of the squeegee blade, the first member being movable in the direction of the second member thereby securing the squeegee blade therebetween and in the trimming position and wherein the holding assembly is positioned in spaced relation relative to the cutter assembly;

an arresting assembly borne by the holding assembly and disposed in juxtaposed relation against an end of the squeegee blade to impede longitudinal deformation of the blade as it is trimmed by the cutter assembly; and means for measuring the thickness of material to be trimmed from the squeegee blade.

10. An apparatus as claimed in claim 9, and wherein the track includes opposite, substantially vertically disposed side walls each having a substantially horizontally disposed channel, and wherein the carriage engages and is movable along the individual channels of the track.

11. An apparatus as claimed in claim 10, and wherein the first and second members include a pair of clamping bars.

12. An apparatus as claimed in claim 11, and wherein the severing member is a blade.

13. An apparatus for trimming a squeegee blade, comprising:

a main frame;

a gantry borne by the main frame;

a track borne by the gantry, the track having opposite, substantially vertically disposed side walls each having a substantially horizontally disposed channel;

a cutter assembly borne by the main frame and including a carriage which engages and is movable along the individual channels of the track, a severing member which is borne by the carriage and operable to trim the squeegee blade, and a securing assembly which is borne by the carriage and operable to releasably secure the severing member in an operational position on the carriage;

a support assembly borne by the main frame for supporting the squeegee blade, the support assembly being movable along a substantially vertically disposed path of travel from a first position to a second position, and wherein the support assembly when disposed in the second position is operable to support the squeegee blade in a trimming position relative to the severing member;

a holding assembly borne by the main frame and disposed in spaced relation relative to the cutter assembly, the holding assembly including first and second members operable to contact opposing sides of the squeegee blade, and wherein the first member is movable in the direction of the second member thereby securing without substantially deformation the squeegee blade therebetween and in the trimming position;

means borne by the main frame for measuring the thickness of material to be trimmed from the squeegee blade; and an arresting assembly borne by the holding assembly and disposed in juxtaposed relation against an end of the squeegee blade to impede longitudinal deformation of the squeegee blade as it is trimmed.

14. An apparatus as claimed in claim 13, and wherein the apparatus further includes a propulsion assembly borne by the main frame for moving the support assembly along the path of travel.

15. An apparatus as claimed in claim 14, and wherein the propulsion assembly for moving the support assembly includes a pair of racks borne by the support assembly, a shaft rotatably borne by the main frame, and a pair of pinions which are borne by the shaft and individually disposed in force engaging relation relative to each of the racks, and wherein rotation of the shaft moves the support assembly along the path of travel.

16. An apparatus as claimed in claim 15, and wherein the first and second members include a pair of substantially parallel clamping bars.

17. An apparatus as claimed in claim 16, and wherein the severing member is a blade.

* * * * *